(12) United States Patent
Crowder et al.

(10) Patent No.: US 11,457,091 B2
(45) Date of Patent: Sep. 27, 2022

(54) UNIFORMITY OF INSTRUCTIONS FOR CONTENT REQUESTS AND RESPONSES IN A CONTENT DELIVERY NETWORK

(71) Applicant: Level 3 Communications, LLC, Broomfield, CO (US)

(72) Inventors: William Crowder, Camarillo, CA (US); Daniel Jensen, Lake Balboa, CA (US); Pawel Jakobowski, Strzebowiska (PL); Laurence Lipstone, Calabasas, CA (US); William Power, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 17/362,079

(22) Filed: Jun. 29, 2021

(65) Prior Publication Data

US 2022/0272160 A1 Aug. 25, 2022

Related U.S. Application Data

(60) Provisional application No. 63/153,134, filed on Feb. 24, 2021.

(51) Int. Cl.
*H04L 67/568* (2022.01)
*H04L 9/40* (2022.01)
(Continued)

(52) U.S. Cl.
CPC ...... *H04L 67/568* (2022.05); *G06F 15/17331* (2013.01); *H04L 63/083* (2013.01); *H04L 67/10* (2013.01)

(58) Field of Classification Search
CPC ... H04L 67/2842; H04L 63/083; H04L 67/10; H04L 63/0263; H04L 63/0218; G06F 15/17331
See application file for complete search history.

(56) References Cited

U.S. PATENT DOCUMENTS 10,042,949 B1 * 8/2018 Farner ................. H04L 67/1023
10,158,650 B1 * 12/2018 Hadiaris ................. G06F 21/64
(Continued)

FOREIGN PATENT DOCUMENTS

EP 3348042 7/2018

OTHER PUBLICATIONS

International Search Report and Written Opinion of the International Searching Authority, dated Dec. 2, 2021, Int'l Appl. No. PCT/US21/039568, Int'l Filing Date Jun. 29, 2021; 11 pgs.

*Primary Examiner* — Muhammad Raza

(57) ABSTRACT

Examples described herein relate to standardizing content requests and responses in a content delivery network (CDN). An edge node receives a control object including sets of instructions each implementing portions of a customer's business logic. The edge node may receive, from a client, a content request identifying a content item, and may apply a set of the instructions which causes the edge node to (i) determine whether any changes are needed for the benefit of a cache server and whether any changes are need for the benefit of an origin server, and (ii) generate a processed client request identifying the content item and including, if needed, any changes for the benefit of the cache server and the origin server. The edge node transmits the processed client request to the cache server, receives a response from the cache server, and transmits a processed client response to the client.

16 Claims, 3 Drawing Sheets

(51) Int. Cl.
*H04L 67/10* (2022.01)
*G06F 15/173* (2006.01)

(56) References Cited

U.S. PATENT DOCUMENTS

| | | | |
|---|---|---|---|
| 11,386,041 B1* | 7/2022 | Gillani | G06F 16/119 |
| 11,412,003 B1* | 8/2022 | Lyon | G06F 16/245 |
| 2013/0159472 A1* | 6/2013 | Newton | H04L 41/0856 |
| | | | 709/219 |
| 2013/0269023 A1 | 10/2013 | Dilley | |

* cited by examiner

UNIFORMITY OF INSTRUCTIONS FOR CONTENT REQUESTS AND RESPONSES IN A CONTENT DELIVERY NETWORK

CROSS-REFERENCE TO RELATED APPLICATIONS

This application claims the benefit of U.S. Provisional Patent Application No. 63/153,134, filed Feb. 24, 2021 and entitled "Uniformity of Instructions for Content Requests and Responses in a Content Delivery Network," the entire contents of which are incorporated by reference herein.

BACKGROUND

A content delivery network (CDN) includes a geographically distributed network of servers configured for facilitating distribution of content items (e.g., videos, images, website content data, and so on) from an origin server to clients that consume the content items. Each server in the CDN can be referred to as a node, a machine, a computer, and so on. To distribute the content items to clients that are geographically remote to the origin server, a node in geographical proximity to the clients can provide the content items to those clients on behalf of the origin server. Different servers in the CDN may be configured to process and respond to content requests, and to interact with one another, in a variety of ways. This can add complexity to the CDN. Additionally, different servers in the CDN may each attempt to authenticate the same client. This too can add complexity to the CDN and can waste computational resources.

BRIEF SUMMARY

Provided herein are systems and methods for uniformity of instructions for content requests and responses in a content delivery network (CDN).

Some examples herein provide a computer-implemented method for standardizing content requests and responses in a CDN. The method may include receiving, by an edge node, a control object from a central authority. The control object may include a client request sheet implementing at least a portion of a customer's business logic. The method may include receiving, by the edge node, a content request from a client, the content request identifying a content item. The method may include applying, by the edge node, the client request sheet responsive to the content request. The client request sheet may cause the edge node to (i) determine whether any change to the content request is needed for the benefit of a cache server and whether any change to the content request is needed for the benefit of an origin server setting, and (ii) generate a processed client request identifying the content item and including, if needed, any changes to the content request for the benefit of the cache server and the origin server. The method may include transmitting, by the edge node, the processed client request to the cache server. The method may include receiving, by the edge node, a response to the processed client request from the cache server. The method may include transmitting, by the edge node, the processed client response to the client.

In some examples, the client request sheet further causes the edge node to (i) authenticate the client and (ii) indicate in the processed client request that the client is authenticated. Based on the processed client request indicating that the client is authenticated, neither the cache server nor the origin server performs an additional authentication of the client.

In some examples, the method further includes receiving, by the cache server, the processed client request; determining, by the cache server, whether the cache server stores the content item identified in the processed client request; and based on the cache server determining that it does not store the content item, transmitting a post-cache processed client request to an upstream computer (such as a node between the cache server and the origin server, or the last node that the request traverses before being communicated to the origin server). In some examples, the method further includes receiving, by the upstream computer, the control object from the central authority and the post-cache processed client request from the cache server. The control object further may include an origin request sheet implementing at least a portion of the customer's business logic. The method may include applying, by the upstream computer, the origin request sheet responsive to the post-cache processed client request. The origin request sheet may cause the upstream computer to (i) determine whether any change to the post-cache processed client request is needed for the benefit of the origin server and (ii) generate a processed origin request identifying the content item and including, if needed, any changes to the post-cache processed client request for the benefit of the origin server. The method may include transmitting, by the upstream computer, the processed origin request to the origin server.

In some examples, the processed origin request is identical to the post-cache processed client request. In some examples, the processed origin request is identical to the processed client request. In some examples, the origin server generates an origin response including the content item identified in the processed origin request and transmits the origin response to a downstream computer (such as the node between the origin server and the cache server). In some examples, the control object further includes an origin response sheet implementing at least a portion of the customer's business logic. The method further may include receiving, by the downstream computer, the origin response. The method further may include applying, by the downstream computer, the origin response sheet responsive to the origin response. The origin response sheet may cause that node to (i) determine whether any change to the origin response is needed for the benefit of the cache server and (ii) generate a processed origin response including the content item and, if needed, any changes to the origin response for the benefit of the cache server. The method further may include receiving, by the cache server, the processed origin response; and transmitting to the edge node a cached processed origin response.

In some examples, the cached processed origin response is identical to the processed origin response. In some examples, the control object further includes a client response sheet implementing at least a portion of the customer's business logic, and the response that the edge node receives to the processed client request includes the cached processed origin response. The method further may include applying, by the edge node, the client response sheet responsive to the cached processed origin response. The client response sheet may cause the edge node to (i) determine whether any changes to the processed origin response are needed for the benefit of the client and (ii) generate the processed client response including the content item and, if needed, any changes to the processed origin response for the benefit of the client. In some examples, the processed client response is identical to the cached processed origin response. In some examples, the processed client response is identical to the processed origin response. In some examples, the processed client response is identical to the origin response.

Some examples herein provide a computer system that includes a processor, a storage device, and a network interface. The processor may be configured to implement operations that include receiving a control object from a central authority via the network interface. The control object may include a client request sheet implementing at least a portion of a customer's business logic. The operations may include storing the received control object in the storage device. The operations may include receiving a content request from a client, the content request identifying a content item. The operations may include applying the client request sheet responsive to the content request. The client request sheet may cause the computer system to (i) determine whether any change to the content request is needed for the benefit of a cache server and whether any change to the content request is needed for the benefit of an origin server, and (ii) generate a processed client request identifying the content item and including, if needed, any changes to the content request for the benefit of the cache server and the origin server. The operations may include transmitting the processed client request to the cache server. The operations may include receiving a response to the processed client request from the cache server. The operations may include transmitting a processed client response to the client.

In some examples, the client request sheet further causes the processor to (i) authenticate the client and (ii) indicate in the processed client request that the client is authenticated. Based on the processed client request indicating that the client is authenticated, neither the cache server nor the origin server performs an additional authentication of the client.

In some examples, the response that the processor receives to the processed client request includes a cached processed origin response. In some examples, the processor further is programmed to apply an origin request sheet responsive to the cached processed origin response. The origin request sheet may cause the processor to (i) determine whether any change to the cached processed origin response is needed for the benefit of a client and (ii) generate the processed client response including the content item and, if needed, any change to the cached processed origin response for the benefit of the client. In some examples, the processed client response is identical to the cached processed origin response. In some examples, the processed client response is identical to the processed origin response. In some examples, the processed client response is identical to the origin response.

These and other features, together with the organization and manner of operation thereof, will become apparent from the following detailed description when taken in conjunction with the accompanying drawings.

DETAILED DESCRIPTION

Figure 1:
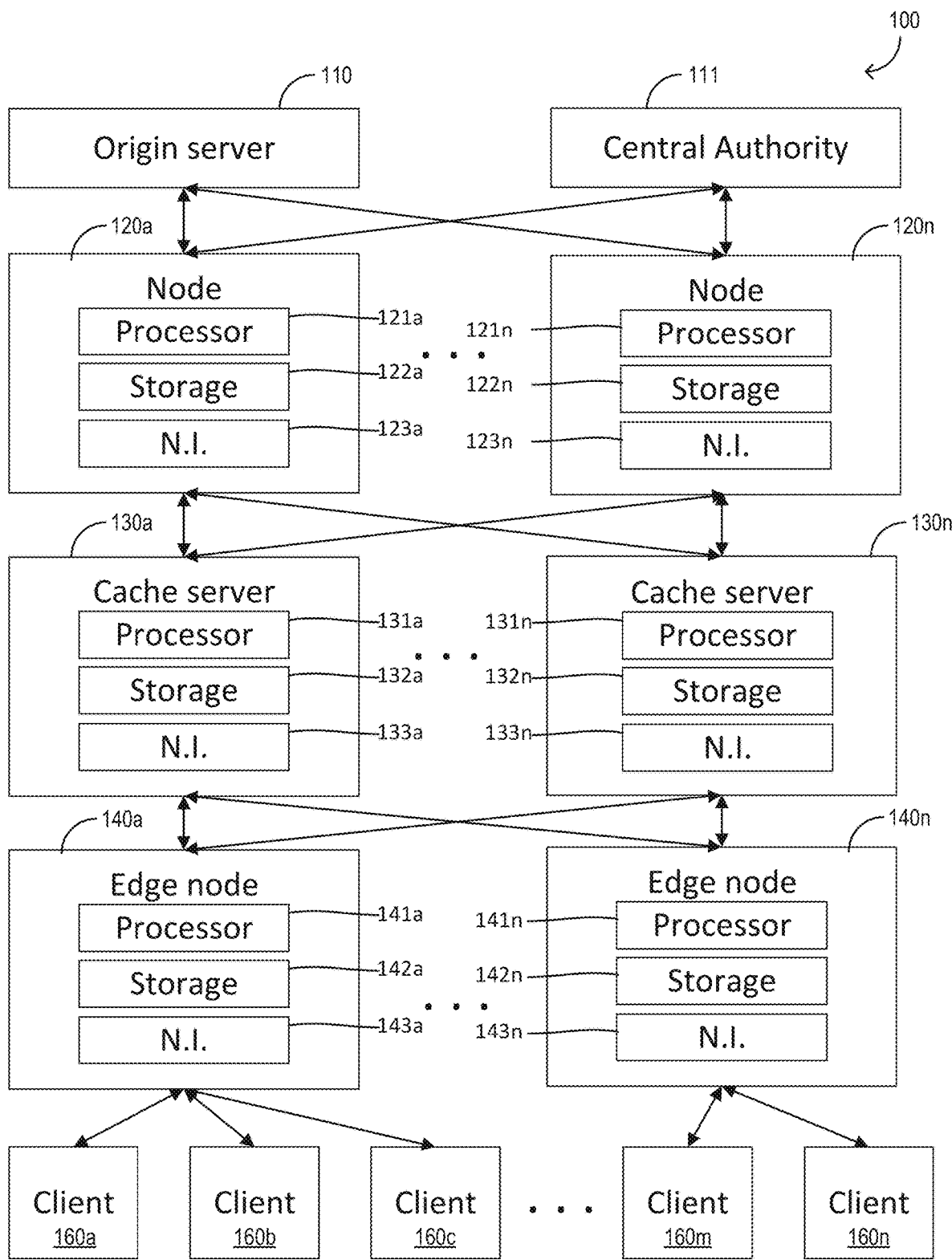
FIG. 1 is a diagram of a content delivery network (CDN) configured to provide uniformity of instructions for content requests and responses, according to various embodiments.

Embodiments described herein relate to uniformity of instructions for content requests and responses in a content delivery network (CDN). However, it should be appreciated that the present systems and methods may be implemented in any suitable computing environment and are not limited to CDNs.

In a CDN, which also may be referred to as a content delivery system, an edge node is a node that initially receives a request for one or more content items from a client. The client refers to a device operated by an end user who desires to consume or otherwise receive one or more of the content items provided by the origin server. The content item is or includes a portion, a segment, an object, a file, or a slice of data stored by the origin server and cached at various nodes throughout the CDN for provisioning to one or more of the clients, e.g., via one or more edge nodes. Servers at which content items are cached may be referred to as cache servers. The origin server refers to a device operated by a customer of the CDN, which facilitates the customer in delivering the content items to respective clients.

Different components of previously known CDNs may receive different types of requests and may issue different types of responses. For example, different clients may send different types of content requests to edge nodes, and the edge nodes may then generate and send their own content requests to cache servers. If the cache servers do not store the content items requested in the content requests, then the cache servers may generate and send their own content requests to an origin server. Similarly, the origin server may respond to the cache servers' requests, the cache servers may respond to the edge nodes' requests, and the edge nodes may respond to the client requests. Any given component of a previously known CDN may use customized programming in order to transmit and receive suitable content requests and responses to the various other components of the CDN, based on the particular rules set forth in the customer's business logic. This adds to complexity of establishing and maintaining the CDN, and of adding components to the CDN at a later time. Additionally, different components of the CDN each may be programmed to authenticate the client prior to responding to a content request. This may add to complexity of the CDN, and may be wasteful because the different instances of authentication are duplicative with one another.

As provided herein, operation of the present CDN may be significantly streamlined through the use of uniform sets of instructions, or "sheets," for content requests and responses. In particular, a central authority may control nodes in the CDN by issuing to each of those nodes a control object that includes different sheets, each of which implements at least a portion of the customer's business logic. Such business logic may include, as nonlimiting examples, rules about: how the nodes should generate different types of content requests; how to respond to different types of content requests; how to differentiate between client requests and internal requests from downstream nodes; how to implement client-specific information within requests or responses such as internet protocol (IP) address, country, headers, or the like; how to authenticate, geo block, or IP block a client; how to transform a request (e.g., standardize a list of content-encodings being requested); or how to respond to different types of responses from other components of the CDN. Based on the respective nodes' particular environment in the CDN, including the type of request or response such nodes receive, the nodes may select from among the different sheets within the control object, and then apply the selected sheet. Illustratively, a node that communicates with the origin server to obtain the content may implement a sheet including one or more rules about: adding headers (e.g., to provide authentication to the origin server), which origin server(s) are to be used, and logic for retry and fail-over to other origin servers. As another example, a node that provides content to clients may implement a sheet including one or more rules about: transforming the reply in some way, e.g., by adding or modifying a response header; or by modifying the response body, e.g., by transforming from one content-encoding to another.

For example, responsive to receiving a respective content request from a given client, each edge node may select a client request sheet from the control object, and may generate a processed client request based on such sheet. The processed client requests from the various edge nodes may have common information as one another and may be modified for the use of other downstream CDN components, such as cache servers or origin servers. For example, the processed client requests may identify the requested content item, may include one or more changes made to the request for the benefit of cache server(s) that may process the request, may include one or more changes made to the request for the benefit of an origin server that may process the request, and/or may carry some or all unprocessed information from the original client's request. Illustratively, carrying unprocessed information from the original client's request may be particularly useful when the node is acting as a proxy for non-cacheable content, and may not be performed routinely and thus usefully may be implemented as an "opt in," rule-based operation. The cache servers and origin servers respectively may process the processed client request using the changes that were made to the request for their benefit. Because the processed client requests may include any needed instructions for the cache servers and origin servers, neither the cache servers nor the origin server necessarily need receive the control object or apply any of the instructions therein. That is, the cache servers and origin servers may follow instructions set forth in the instructions they may receive via the processed client request, but need not themselves apply any rules set forth by a customer's business logic. Thus, it will be appreciated that the control object reduces or obviates the need for customized programming of certain CDN components to aid in their being able to communicate with one another.

FIG. 1 is a diagram of a CDN 100 according to some embodiments. Referring to FIG. 1, the CDN 100 is configured for delivering content items provided by origin server 110 to various clients 160a ... 160n via nodes 120a ... 120n (which may be collectively referred to herein as nodes 120), cache servers 130a ... 130n (which may be collectively referred to herein as cache servers 130), and edge nodes 140a ... 140n (which may be collectively referred to herein as edge nodes 140). Central authority 111 directly or indirectly distributes a control object to each of nodes 120a ... 120n and to each of edge nodes 140, e.g., an object that includes sheets implementing at least a portion of a customer's business logic. A user of a respective one of the clients 160a ... 160n may request and receive the content items provided by the origin server 110 via nodes 120, cache servers 130 and edge nodes 140. In some embodiments, each of the clients 160a ... 160n can be a desktop computer, mainframe computer, laptop computer, pad device, smart phone device, or the like, configured with hardware and software to perform operations described herein. For example, each of the clients 160a ... 160n includes a network device and a user interface. The network device is configured to connect the clients 160a ... 160n to a node (e.g., an edge node 140) of the CDN 100. The user interface is configured for outputting (e.g., displaying media content, games, information, and so on) based on the content items as well as receiving user input from the users.

In some examples, the CDN 100 is configured for delivering and distributing the content items originating from the origin server 110 to the clients 160a ... 160n. For example, the CDN 100 includes nodes 120, cache servers 130, and edge nodes 140, where the origin server 110 is connected directly or indirectly to some or all of nodes 120a ... 120n; each of nodes 120a ... 120n is connected directly or indirectly to some or all of cache servers 130a ... 130n; and each of cache servers 130a ... 130n is connected directly or indirectly to at least some or all of edge nodes 140a ... 140n, optionally via intervening nodes (not specifically illustrated). The origin server 110, the nodes 120, cache servers 130, edge nodes 140, and any other nodes in the CDN 100 not shown can be located in different locations than one another, thus forming the geographically distributed CDN 100. While there can be additional nodes 120 between the cache servers 130 and the origin server 110, the cache servers 130 can be directly connected to the origin server 110 and can be configured to perform processing such as described with reference to nodes 120. Similarly, the processing attributed to edge nodes 140 may be performed by one or more of cache servers 130, and the control object also may be provided to such cache server(s) and used in a similar manner as described herein for the edge nodes; otherwise, the cache servers need not receive or implement the control object. In some configurations, any suitable combination of origin server 110, central authority 111, nodes 120, cache servers 130, and edge nodes 140 may be configured to implement the present functionality for uniformity of instructions for content requests and responses.

The content items of the origin server 110 can be replicated and cached in multiple locations (e.g., multiple nodes) throughout the CDN 100, including in the storage 122 of nodes 120, storage 132 of cache servers 130, and storage 142 of edge nodes 140, as well as in storage of other nodes (not shown). As used herein, cache server 130 refers to any node in the CDN 100 (between the origin server 110 and the edge node 140) that stores copies of content items provided by the origin server 110. The origin server 110 refers to the source of the content items. The origin server 110 can belong to a customer (e.g., a content owner, content publisher, or a subscriber of the system 100) of the CDN 100 such that the customer pays a fee for using the CDN 100 to deliver the content items to clients. Examples of content items include, but are not limited to, webpages and web objects (e.g., text, graphics, scripts, and the like), downloadable objects (e.g., media files, software, documents, and the like), live streaming media, on-demand streaming media, social networks, and applications (e.g., online multiplayer games, dating applications, e-commerce applications, portals, and the like), and so on.

The nodes 120, cache servers 130, edge nodes 140, and any other nodes (not shown) between the edge nodes 140 and the origin server 110 and central authority 111 form a "backbone" of the CDN 100, providing a path from the origin server 110 to the clients 160a ... 160n. The cache servers 130 are upstream with respect to the edge nodes 140 given that the cache servers 130 are between respective edge nodes 140 and the origin server 110 as well as central authority 111, the edge nodes 140 are downstream of cache servers 130, and nodes 120 are downstream of origin server 110 and central authority 111. In some embodiments, the edge node 140 is referred to as an "edge node" given the proximity of the edge node 140 to the clients 160a ... 160n.

Central authority 111 may provide a control object to any of the nodes directly, or indirectly via one or more other nodes.

Links between CDN components correspond to suitable network connections for exchanging data, such as content requests and responses. The network connections can be any suitable Local Area Network (LAN) or Wide Area Network (WAN) connection. For example, each network link can be supported by Frequency Division Multiple Access (FDMA), Time Division Multiple Access (TDMA), Synchronous Optical Network (SONET), Dense Wavelength Division Multiplexing (DWDM), Optical Transport Network (OTN), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like.

In the example configuration illustrated in FIG. 1, each of edge nodes 140*a* . . . 140*n* is a computer system that includes a respective processor 141*a* . . . 141*n*, storage 142*a* . . . 142*n*, and network interface (N.I.) 143*a* . . . 143*n*. The processors 141*a* . . . 141*n* may be configured to implement instructions that include receiving a control object from central authority 111 via respective network interfaces 143*a* . . . 143*n*. The control object may include any suitable number of sheets, each of which implements at least a portion of the customer's business logic. The processors 141*a* . . . 141*n* may be configured to store the control object in storage 142*a* . . . 142*n*. The processors 141*a* . . . 141*n* further may be configured to implement instructions that include receiving content requests from clients 160*a* . . . 160*n* (e.g., via NI 143*a* . . . 143*n*). The processors 141*a* . . . 141*n* further may be configured to implement instructions that include applying a client request sheet in the control object responsive to the content requests. For example, the processors 141*a*-141*n*, based on their environment (being located between the clients and the cache servers, and having received a content request) may select the client request sheet from among the sheets within the control object, where that sheet contains rules to be applied by a node within that environment. Elements in CDN 100 may be aware of or may be configured to determine where in the fill path they belong. Edge nodes 140*a* . . . 140*n* that are directly connected to a client 160*a* . . . 160*n* may execute "client request" sheets and "client response" sheets, while nodes that are responsible to fill resources from one or more origin servers 110, e.g., nodes 120*a* . . . 120*n* may execute "origin request" sheets and "origin response" sheets.

The client request sheet may cause processors 141*a* . . . 141*n* to determine whether any change to the content request is needed for the benefit of cache server(s) 130*a*-130*n* and whether any change to the content request is needed for the benefit of origin server 110. In one nonlimiting example, the client request sheet includes a rule to add a header to the request that identifies it as having been initially processed, thereby letting other components of the CDN know how to handle the request and that such components need not re-run the client request processing. The client request sheet also may cause processors 141*a* . . . 141*n* to generate a processed client request identifying the content item (for example, by URL), if needed, any changes for the benefit of the cache server and the origin server. Illustratively, a change made for the benefit of the cache server may include modifying (e.g., normalizing) a client request header so as to limit the number of variants (different versions of a resource) that may be selected by the request. Illustratively, a change made for the benefit of the origin server may include choice of a particular origin server based on the request at hand. Note that the change made for the benefit of the origin server instead may be implemented using an origin request sheet such as described further below, but implementing such change using the client request sheet may consolidate and simplify the logic, at the expense of carrying that change along with the request as it makes its way upstream. In this regard, note that any changes implemented in the processed client request may affect suitable upstream layers of the CDN, and may be further altered or supplemented using additional sheets in a manner such as described in greater detail below. Illustratively, any origin request rules that are carried in the processed client request may be acted on by a node 120. Additionally, because the processed client request may already include changes for the benefit of cache servers 130*a* . . . 130*n* and origin server 110, the cache servers 130*a* . . . 130*n* need not necessarily apply business logic or substantively alter the processed client requests in order to make such requests suitable for use by origin server 110. Additionally, edge node processors 141*a* . . . 141*n* may, based on the client request sheet, store any needed changes made for the benefit of clients 160*a* . . . 160*n* locally in a client transaction object for later use, rather than forwarding those changes to cache servers 130*a* . . . 130*n* for which such changes may unnecessarily consume computational resources.

As a further option, the client request sheet may cause edge node processors 141*a* . . . 141*n* to implement instructions that include authenticating clients 160*a* . . . 160*n* and indicating in the processed client requests that the clients are authenticated. For example, the authentication instructions in the client request sheet may cause edge node processors 141*a* . . . 141*n* either to reject the request or to allow the request to continue upstream. Generally speaking, there are two ways for upstream servers to know that a request has been processed: it may carry a header indicating such, or it may come from a known machine (e.g., by checking IP address) that is known to belong to the CDN as opposed to a client. In some implementations, the header approach is implemented via suitable instructions in the client request sheet. Based on the processed client requests indicating that the client is authenticated, neither cache servers 130*a* . . . 130*n*, nor nodes 120*a* . . . 120*n*, nor origin server 110 need perform an additional authentication of the client. As such, fewer resources may be wasted on re-authenticating clients at multiple components of CDN 100 and transmitting information used to perform such authentications.

Referring still to FIG. 1, each of cache servers 130*a* . . . 130*n* is a computer system that includes a respective processor 131*a* . . . 131*n*, storage 132*a* . . . 132*n*, and network interface (N.I.) 133*a* . . . 133*n*. The processors 131*a* . . . 131*n* may be configured to implement instructions that include receiving processed client requests from edge nodes 140*a* . . . 140*n*, and determining whether the respective cache server stores the content item identified in the processed client request. In some configurations, processors 131*a* . . . 131*n* may be configured to, based on determining that the cache server 130*a* . . . 130*n* does not store the content item in storage 132*a* . . . 132*n*, transmit a post-cache processed client request to nodes 120a ... 120n (or directly to origin server 110). The post-cache processed client request may be identical to the processed client request, or may include additional information such as one or more conditional headers. As noted above, cache servers 130a ... 130n need not necessarily receive the control object from central authority 111, and need not necessarily apply any of the sheets in the control object.

Referring still to FIG. 1, each of nodes 120a ... 120n is a computer system that includes a respective processor 121a ... 121n, storage 122a ... 122n, and network interface (N.I.) 123a ... 123n. The processors 121a ... 121n may be configured to implement instructions that include receiving the control object from central authority 111 via respective network interfaces 123a ... 123n. The processors 121a ... 121n may be configured to store the control object in storage 122a ... 122n. The processors 121a ... 121n may be configured to implement instructions that include receiving post-cache processed client requests from cache servers 130a ... 130n. The processors 121a ... 121n further may be configured to implement instructions that include applying an origin request sheet in the control object responsive to the post-cache processed client requests. For example, the processors 121a-121n, based on their environment (being located between the cache servers and the origin server, and having received a post-cache processed client request) may select the origin request sheet from among the sheets within the control object, where that sheet contains rules to be applied by a node within that environment. Generally speaking, intermediate nodes in the cache hierarchy may not necessarily need to apply any special changes, and instead may simply forward processed client requests. Eventually, though, each client request reaches a component of the CDN that is responsible for communicating with the origin server (and it knows this by its configuration). Such component then may apply the origin request sheet and origin response sheet.

For example, the origin request sheet may cause processors 121a ... 121n to (i) determine whether a particular change to the post-cached processed client request is needed for the benefit of origin server 110 and (ii) generate a processed origin request identifying the content item and, if needed, any change for the benefit of the origin server. The processed origin request may identify the requested content item (for example, by URL), may include, if needed, a change for the benefit of origin server 110 that may be the same or different than the change that may have been included in the processed client request (for example, a different URL, a removed or added header, a modified protocol, and/or a modified http method). Illustratively, the processed origin request may include added information relative to the processed client request, e.g., may add new header(s). Alternatively, the processed origin request may be identical to the post-cache processed client request, or may be identical to the processed client request (e.g., if the processed client request was identical to the post-cache processed client request). Additionally node processors 121a ... 121n may, based on the origin request sheet, store any needed changes for the benefit of cache servers 130a ... 130n locally in an origin transaction object for later use. The origin request sheet causes processors 121a ... 121n to transmit the processed origin requests to origin server 110.

In system 100 illustrated in FIG. 1, origin server 110 is configured to generate origin responses to the processed client requests and to transmit the origin responses to nodes 120a ... 120n (or directly to cache servers 130a ... 130n). The origin responses may include the content items identified in the processed origin requests. As noted above, origin server 110 need not necessarily receive the control object from central authority 111, and need not necessarily apply any of the sheets in the control object.

The processors 121a ... 121n may be configured to implement instructions that include receiving the origin responses from origin server 110. The processors 121a ... 121n further may be configured to implement instructions that include applying an origin response sheet in the control object responsive to the post-cache processed client request. For example, the processors 121a-121n, based on their environment (being located between the cache servers and the origin server, and having received an origin response) may select the origin response sheet from among the sheets within the control object, where that sheet contains rules to be applied by a node within that environment. Illustratively, nodes that are configured to talk to the origin servers (which is part of their configuration or part of the network configuration) know that because of their place in the network, it is up to them to apply the origin request sheet and origin response sheet.

The origin response sheet may cause processors 121a ... 121n to (i) determine whether any change to the origin response sheet is needed for the benefit of cache servers 130a ... 130n and (ii) generate a processed origin response including the content item and, if needed, any changes for the benefit of the cache servers. The changes for the benefit of the cache servers may be the same or different than any changes that may have been included in the processed client request. The processed origin response may include added information relative to the origin response, e.g., may include any changes made for the benefit of the cache servers that had been stored in the origin transaction object. Additionally, or alternatively, the origin response sheet may force processors 121a ... 121n to discard the origin response and either contact another origin server using the same or different request, or generate its own response. That is, processing the origin response sheet may cause a given origin response to be discarded and a new one retrieved. The origin response sheet may implement "origin specific rules" that allow the repeated request to be subject to origin-specific logic. Alternatively, the processed origin response may be identical to the origin response. The origin response sheet causes processors 121a ... 121 to transmit the processed origin responses to cache servers 130a ... 130n. Cache servers 130a ... 130n may be configured to receive the processed origin responses from nodes 120a ... 120n, and to transmit to edge nodes 140a ... 140n cached processed origin responses. The cached processed origin responses may be identical to the processed origin responses.

Processors 141a ... 141n of edge nodes 140a ... 140n may be configured to receive the cached processed origin responses from the cache servers 130a ... 130n. The processors 141a ... 141n further may be configured to implement instructions that include applying a client response sheet in the control object responsive to the cached processed origin responses. For example, the processors 141a-141n, based on their environment (being located between the clients and the cache servers) may select the client response sheet from among the sheets within the control object, where that sheet contains rules to be applied by a node within that environment.

The client response sheet may cause processors 141a ... 141n to (i) determine whether any particular change to the cached processed origin response is needed for the benefit of clients 160a ... 160n and (ii) generate a processed client response including the content item and, if needed, any changes for the benefit of the clients. The processed client response may include added information relative to the cached processed origin response, e.g., may include any changes made for the benefit of the client that had been stored in the client transaction object. The client response sheet may be used rarely, but one possible application for it is to include a client-specific "cookie" by setting a client-specific Set-Cookie header based on logic within the client response sheet. The client response sheet may be used to modify responses, including cached processed origin responses, in a client-specific way. The processed client response need not necessarily be cached. Alternatively, the processed client response may be identical to the cached processed origin response, or to the processed origin response (e.g., if the cached processed origin response is identical to the processed origin response), or to the origin response (e.g., if the cached processed origin response and the processed origin response are identical to the origin response). The processors 141a ... 141n then transmit the processed origin responses, or other suitable response based on the client response sheet, to the clients 160a ... 160n.

Each of processors 121a ... 121n, 131a ... 131n, and 141a ... 141n can be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. Processors 131a ... 131n and 141a ... 141n respectively may include or may be coupled to memory (not specifically illustrated), e.g., a Random Access Memory (RAM), Read-Only Memory (ROM), Non-Volatile RAM (NVRAM), flash memory, hard disk storage, or another suitable data storage unit, which stores data and/or computer code for facilitating the various processes executed by the processors 121a ... 121n, 131a ... 131n, and 141a ... 141n. The memory may be or include tangible, non-transient volatile memory or non-volatile memory. Accordingly, the memory includes database components, object code components, script components, or any other type of information structure for supporting the various functions described herein. Each storage 122a ... 122n, 132a ... 132n, and 142a ... 142n can include a mass storage device, such as a hard disk drive or solid state drive. Network interfaces 123a ... 123n, 133a ... 133n, and 143a ... 143n include any suitable combination of hardware and software to establish communication with other components of the CDN as appropriate. In some implementations, each of the network interfaces include a cellular transceiver (configured for cellular standards), a local wireless network transceiver (for 802.11X, ZigBee, Bluetooth, Wi-Fi, or the like), a wired network interface, a combination thereof (e.g., both a cellular transceiver and a Bluetooth transceiver), and/or the like.

Figure 2:
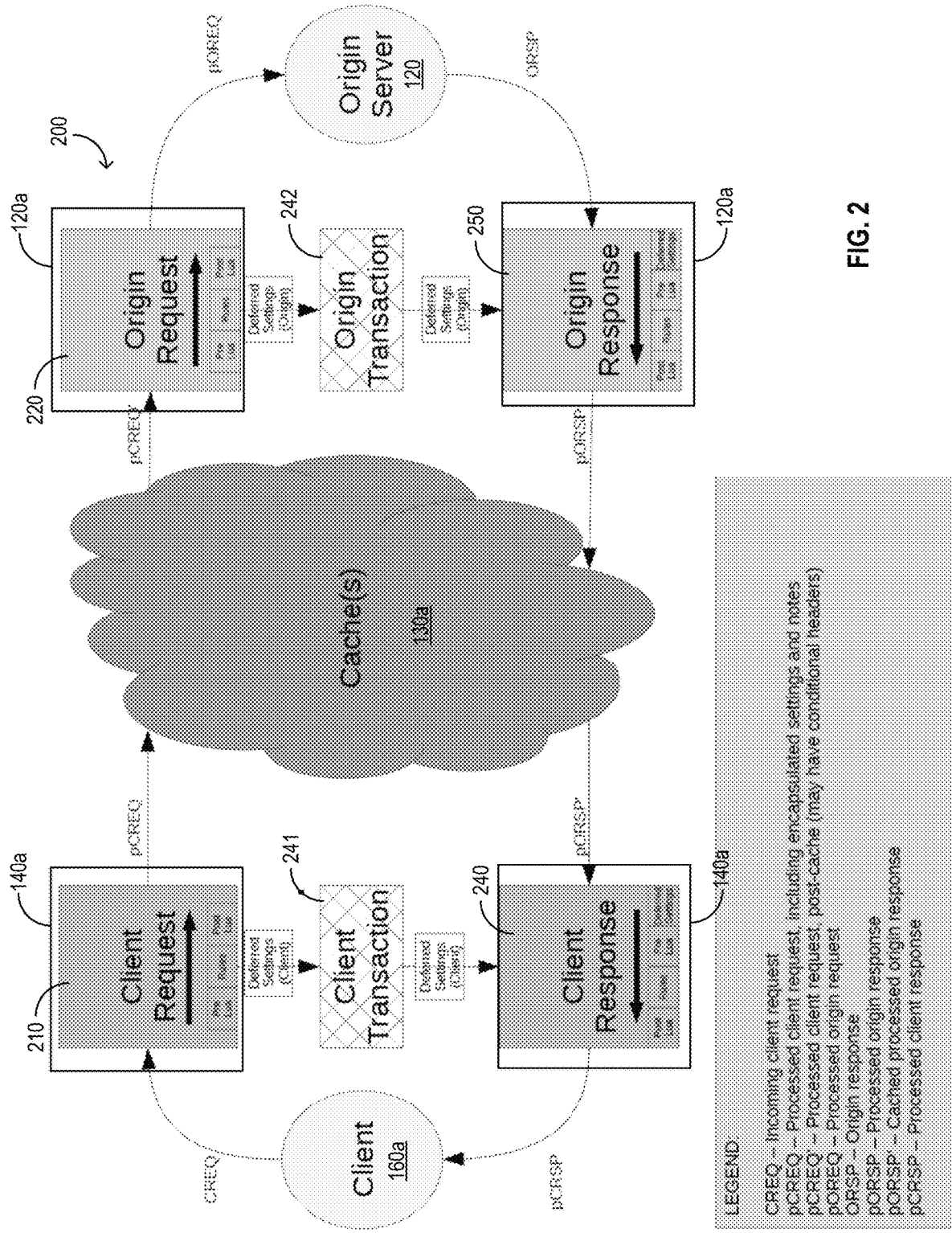
FIG. 2 is a diagram of a process flow of content requests and responses in a CDN, according to various embodiments.

FIG. 2 is a diagram of a process flow of content requests and responses in a CDN, according to various embodiments. Client 160a transmits incoming client request CREQ to edge node 140a which generates, based on CREQ and a client request sheet in a control object obtained from a central authority (not specifically illustrated), a processed client request (pCREQ) such as described above with reference to FIG. 1. pCREQ may identify the requested content item and may include encapsulated settings for cache(s) 130a and origin server 120, and notes. For example, node 140a may determine that CREQ does not include certain settings that cache 130a or origin server 110 may require. Illustratively, the request that is sent upstream (toward the origin server 120) may include some settings (which may be encapsulated in a header) that cause the node communicating with the origin server to take some action or perform some modifications. These may be called "settings" because they are called out during client request processing and may be passed along so as to be acted on at the appropriate point in the processing. Generating pCREQ may include performing pre Lua processing. Generating pCREQ may include applying rules defined in the client request sheet, such as including settings which affect cache and origin processing (e.g., CCHOMode), and adding notes. Generating pCREQ may include performing post Lua processing. It should be clear that Lua is only one possible language that may be used for pre- and post-rules processing. If client 160a has particular requirements, e.g., expectations about settings for responses, such as setting of response headers called for during response processing, edge node 140a may extract information about those settings and store that information for later (deferred) use, rather than forwarding those settings to cache(s) 130a which would have little use for such settings. Thus computational resources may be saved by omitting to send any client-particular settings to other elements in the CDN. Illustratively, edge node 140a may create Client Transaction object 241 in which deferred client settings may be stored. The transaction object may be or include an entity within a node that carries information about the client request and eventually the client response. It may also be used to save information for later processing (e.g., within the same node), which means that such information need not be transmitted within the request or reflected on the reply in order to be acted on (e.g., again within the same node). In this regard, the transaction object may be considered to provide a "scratch pad" that different points in the processing within a node may modify and inspect.

Edge node 140a transmits pCREQ to cache 130a which determines whether the cache stores the requested content item identified in pCREQ. If cache 130a determines that it does not store that requested content item, it may generate, based on pCREQ, a post-cache processed client request pCREQ' that is modified relative to pCREQ, e.g., that may include conditional headers, or that is identical to pCREQ. Cache 130a may transmit pCREQ' to node 120a.

Node 120a receives pCREQ' and may generate, based on pCREQ' and an origin request sheet in the control object received from the central authority, a processed origin request (pOREQ) 220 such as described above with reference to FIG. 1, e.g., identifies the requested content item and includes encapsulated settings and notes. For example, node 120a may determine based on the origin request sheet that pCREQ' does not include certain settings that origin server 110 requires. In some examples, generating pOREQ may include performing pre Lua processing. Generating pOREQ may include applying rules set forth in the origin request sheet, such as including settings which affect origin processing, and adding notes. Generating pOREQ may include performing post Lua processing. It should be clear that Lua is only one possible language that may be used for pre- and post-rules processing. If cache 130a has particular requirements, e.g., expectations about settings for responses, such as setting of response headers called for during response processing, node 120a may extract information about those settings and store that information for later (deferred) use. Illustratively, node 120a creates Origin Transaction object 242 in which deferred origin settings may be stored. If node 120a determines that pCREQ' includes all of the information that origin server 110 requires, then pOREQ' may be identical to pCREQ'.

Origin server 110 receives pOREQ from node 120a, and generates origin response ORSP that may include the requested content item, or may include information about why the requested content item is not included (e.g., that the content item is unavailable). In some examples, node 120a, which transmitted pOREQ to origin server 110, receives ORSP from origin server 110 and may generate, based on ORSP and an origin response sheet in the control object, a processed origin response (pORSP) 250 such as described above with reference to FIG. 1, e.g., includes the requested content item or other response about the requested content item, and includes encapsulated settings and notes. For example, node 120a may determine, based on the origin response sheet, that ORSP does not include certain information that cache 130a, the node between cache 130a and client 160a, or client 160a, requires. In some examples, generating pORSP may include performing pre Lua processing. Generating pORSP may include applying rules set forth in the origin response sheet, such as including settings which affect client or cache processing, and adding notes. Generating pORSP may include performing post Lua processing. It should be clear that Lua is only one possible language that may be used for pre- and post-rules processing. If cache 130a, node 140a, or client 160a, has particular requirements, e.g., expectations about settings for responses, such as setting of response headers called for during response processing, node 120a may add the deferred origin settings from Origin Transaction object 242 to pORSP. Alternatively, pORSP may be identical to ORSP.

Node 120a then transmits pORSP to the same cache server 130a that transmitted pCREQ' to node 120a, which determines, based on pORSP, if any further action or response is required by the cache. If cache 130a determines that no further action or response is required by the cache, the cache may generate a cached processed origin response pORSP' that is modified relative to pORSP, e.g., that may include conditional headers, or that is identical to pORSP, and may transmit pORSP' to node 140a.

Node 140a may generate, based on pORSP' and a client response sheet in the control object, a processed client response (pCRSP) 240 such as described above with reference to FIG. 1, e.g., that includes the requested content item or other response about the requested content item. For example, node 140a may determine, based on the client response sheet, that pORSP' does not include certain information that client 160a requires. In some examples, generating pCRSP may include performing pre Lua processing. Generating pCRSP may include applying rules set forth in the client response sheet, such as settings which affect client processing, and adding notes. Generating pCRSP may include performing post Lua processing. It should be clear that Lua is only one possible language that may be used for pre- and post-rules processing. If client 160a has particular requirements, e.g., expectations about settings for responses, such as setting of response headers called for during response processing, node 140a may add the deferred client settings from Client Transaction object 241 to pCRSP.

It will be appreciated that in some circumstances, the content request from client 160a, CREQ, may not necessarily identify a content item that is available or valid, or that some other value or property of CREQ may be invalid. Additionally, in some circumstances, a request may identify a content item that is stored locally, and therefore may be responded to without transmitting requests to any upstream components of the CDN. For example, node 140a may check CREQ, and may determine that the request was invalid or because that node locally stores the requested content item. Rather than generating pCREQ and transmitting pCREQ to cache 130a, node 140a instead may generate processed client response 240 directly (pCRSP), and may transmit pCRSP to client 160a. In this circumstance, pCRSP may include a response explaining why the request identified in CREQ was not completed, or may include the requested content item if that item was stored locally at node 140a.

Similarly, cache 130a may check pCREQ, and may determine that pCREQ should not be transmitted to node 120a, for example because the request matches a cached negative response or because the cache locally stores the requested content item. Rather than transmitting pCREQ' to node 120a, cache 130a instead may directly generate pORSP', and may transmit pORSP' to the node 140a. In this circumstance, pORSP' may include a response explaining why the request identified in pCREQ was not completed, or may include the requested content item if that item was stored locally at the cache.

Similarly, node 120a may check pCREQ', and may determine that pCREQ' should not be transmitted to origin server 110, for example because the request matched a cached response. Rather than transmitting pOREQ to origin server 110, node 120a instead may directly generate pORSP, and may transmit pORSP to cache 130a. In this circumstance, pORSP may include a response explaining why the request identified in pCREQ' was not completed. pORSP' then may be processed by node 140a in a manner such as described elsewhere therein.

Similarly, origin server 110 may check pOREQ, and may determine that the requested content item identified in pOREQ is unavailable or that the request is invalid. In this circumstance, ORSP may include a response explaining why the request identified in pOREQ was not completed. ORSP then may be processed by node 120a, cache 130a, and node 140a in a manner such as described elsewhere herein.

Figure 3:
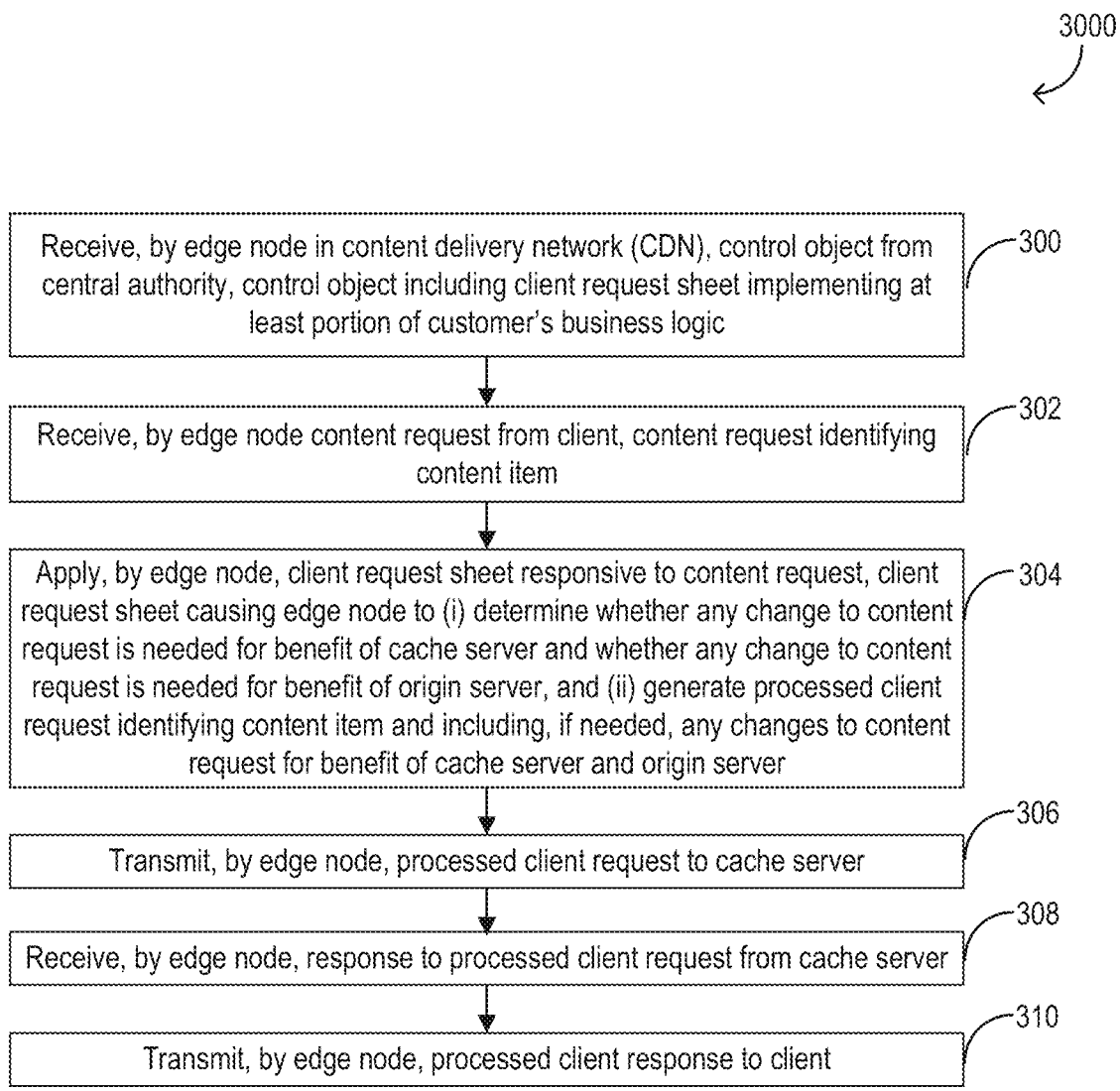
FIG. 3 is a flow diagram illustrating a method for providing uniformity of instructions for content requests and responses in a CDN, according to various embodiments.

Any suitable combination of computers or processing circuits within CDN 100, such as described with reference to FIG. 1, or any other suitable computer or processing circuit, may be configured for use in a method for providing uniformity of instructions for content requests and responses in a manner such as provided herein. For example, FIG. 3 illustrates a flow of operations in an exemplary method 3000 for providing uniformity of instructions for content requests and responses in a CDN, according to various configurations provided herein. Method 3000 described with reference to FIG. 3 may be implemented by any suitable computer including a processor, a storage device, and a network interface.

Method 3000 illustrated in FIG. 3 includes receiving, by an edge node in the CDN, a control object from a central authority in the CDN (operation 300). The control object includes sheets (e.g., four sheets) each of which implements at least a portion of a customer's business logic. Method 3000 illustrated in FIG. 3 includes receiving, by the edge node, a content request from a client, the content request identifying a content item (operation 302). For example, edge nodes 140a . . . 140n may receive content requests CREQ from respective clients 160a . . . 160n. Method 3000 includes applying, by the edge node, a client request sheet responsive to the content request (operation 304). The client request sheet causes the edge node to (i) determine whether any change to the content request is needed for the benefit of a cache server and whether any change to the content request is needed for the benefit of an origin server, and (ii) generate a processed client request identifying the content item and including, if needed, any changes to the content request for the benefit of the cache server and the origin server, e.g., in a manner such as described with reference to FIGS. 1-2. For example, edge nodes 140a . . . 140n may generate pCREQs based on CREQs and control objects that such nodes receive. Method 3000 includes transmitting, by the edge node, the processed client request to the cache server (operation 306). For example, edge nodes 140a . . . 140n may transmit pCREQs to caches 130a . . . 130n. Method 3000 includes receiving, by an edge node, a response to the processed client request from the cache server (operation 308). For example, edge nodes 140a . . . 140n may receive pORSP's from caches 130a . . . 130n. These edge nodes may be the same or different than the edge nodes that performed operations 302-306. Method 3000 includes transmitting, by the edge node, received processed client response to the client (operation 310). For example, edge nodes 140a . . . 140n may transmit or pCRSPs to clients 160a . . . 160n in a manner such as described with reference to FIGS. 1-2.

Accordingly, the present standardization of content requests and responses may significantly simplify the processing implemented by various components of a CDN, and reduce or eliminate the need for customizing the programming of those components to allow them to interact with one another appropriately.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices, such as one or more primary storage devices or secondary storage devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, ASICs, FPGAs, DSPs, or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the system, for example the one or more processors may be a remote processor (e.g., a cloud based processor). Alternatively or additionally, the one or more processors may be internal and/or local to the system. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computer, special purpose computer, or special purpose processing machine including a processing unit, a system memory device, and a system bus that couples various system components including the system memory device to the processing unit. The system memory may be or include the primary storage device and/or the secondary storage device. One or more of the system memory, primary storage device, and secondary storage device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and embodiment of the principles without departing from the scope of the present disclosure as expressed in the appended claims.

What is claimed is:

1. A computer-implemented method for standardizing content requests and responses in a content delivery network (CDN), the computer-implemented method comprising:
    receiving, by an edge node, a control object from a central authority, the control object comprising a client request sheet implementing at least a portion of a customer's business logic;
    receiving, by the edge node, a content request from a client, the content request identifying a content item;
    applying, by the edge node, the client request sheet responsive to the content request, wherein applying the client request sheet includes determining, by the edge node, any change to the content request is needed for the benefit of a cache server and any change to the content request is needed for the benefit of an origin server, (ii) generating, by the edge node, a processed client request identifying the content item and including any changes to the content request for the benefit of the cache server and the origin server, (iii) authenticating, by the edge node, the client, and (iv) indicating in the processed client request, by the edge node, that the client is authenticated;
    transmitting, by the edge node, the processed client request to the cache server;
    receiving, by the edge node, a response to the processed client request from the cache server;
    transmitting, by the edge node, the processed client response to the client;
    receiving, by the cache server, the processed client request;
    determining, by the cache server, that the cache server stores the content item identified in the processed client request;
    based on the cache server determining that it does not store the content item, transmitting a post-cache processed client request to an upstream computer;
    receiving, by the upstream computer, the control object from the central authority and the post-cache processed client request from the cache server, the control object further comprising an origin request sheet implementing at least a portion of the customer's business logic;
    applying, by the upstream computer, the origin request sheet responsive to the post-cache processed client request, the origin request sheet causing that node to (i) determine any change to the post-cache processed client request is needed for the benefit of the origin server and (ii) generate a processed origin request identifying the content item and including any changes to the post-cache processed client request for the benefit of the origin server; and
    transmitting, by the upstream computer, the processed origin request to the origin server, wherein
    based on the processed client request indicating that the client is authenticated, neither the cache server nor the origin server performs an additional authentication of the client.

2. The computer-implemented method of claim 1, wherein the processed origin request is identical to the post-cache processed client request.

3. The computer-implemented method of claim 1, wherein the processed origin request is identical to the processed client request.

4. The computer-implemented method of claim 1, wherein the origin server generates an origin response including the content item identified in the processed origin request and transmits the origin response to a downstream computer.

5. The computer-implemented method of claim 4, the control object further comprising an origin response sheet implementing at least a portion of the customer's business logic, the method further comprising:
    receiving, by the downstream computer, the origin response;
    applying, by the downstream computer, the origin response sheet responsive to the origin response, the origin response sheet causing that node to (i) determine any change to the origin response is needed for the benefit of the cache server and (ii) generate a processed origin response including the content item and, if needed, any changes to the origin response for the benefit of the cache server.

6. The computer-implemented method of claim 5, further comprising:
    receiving, by the cache server, the processed origin response; and
    transmitting to the edge node a cached processed origin response.

7. The computer-implemented method of claim 6, wherein the cached processed origin response is identical to the processed origin response.

8. The computer-implemented method of claim 6, wherein:
- the control object further comprises a client response sheet implementing at least a portion of the customer's business logic;
- the response that the edge node receives to the processed client request comprises the cached processed origin response; and
- the method further comprises applying, by the edge node, the client response sheet responsive to the cached processed origin response, the client response sheet causing the edge node to (i) determine any changes to the processed origin response are needed for the benefit of the client and (ii) generate the processed client response including the content item and, if needed, any changes to the processed origin response for the benefit of the client.

9. The computer-implemented method of claim 8, wherein the processed client response is identical to the cached processed origin response.

10. The computer-implemented method of claim 8, wherein the processed client response is identical to the processed origin response.

11. The computer-implemented method of claim 8, wherein the processed client response is identical to the origin response.

12. A computer system comprising a processor, a storage device, and a network interface, the processor being configured to implement operations comprising:
- receiving a control object from a central authority via the network interface, the control object comprising client request sheet implementing at least a portion of a customer's business logic;
- storing the received control object in the storage device;
- receiving a content request from a client, the content request identifying a content item;
- applying the client request sheet responsive to the content request, wherein applying the client request sheet includes determining, by the computer system, any change to the content request is needed for the benefit of a cache server and any change to the content request is needed for the benefit of an origin server, (ii) generating, by the computer system, a processed client request identifying the content item and including any changes to the content request for the benefit of the cache server and the origin server, (iii) authenticating, by the computer system, the client, and (iv) indicating in the processed client request, by the computer system, that the client is authenticated;
- transmitting the processed client request to the cache server;
- receiving a response to the processed client request from the cache server;
- transmitting a processed client response to the client;
- receiving, by the cache server, the processed client request;
- determining, by the cache server, that the cache server stores the content item identified in the processed client request;
- based on the cache server determining that it does not store the content item, transmitting a post-cache processed client request to an upstream computer;
- receiving, by the upstream computer, the control object from the central authority and the post-cache processed client request from the cache server, the control object further comprising an origin request sheet implementing at least a portion of the customer's business logic;
- applying, by the upstream computer, the origin request sheet responsive to the post-cache processed client request, the origin request sheet causing that node to (i) determine any change to the post-cache processed client request is needed for the benefit of the origin server and (ii) generate a processed origin request identifying the content item and including any changes to the post-cache processed client request for the benefit of the origin server; and
- transmitting, by the upstream computer, the processed origin request to the origin server, wherein
- based on the processed client request indicating that the client is authenticated, neither the cache server nor the origin server performs an additional authentication of the client.

13. The computer system of claim 12, wherein:
- the response that the processor receives to the processed client request comprises a cached processed origin response; and
- the processor further is programmed to apply an origin request sheet responsive to the cached processed origin response, the origin request sheet causing the processor to (i) determine whether any change to the cached processed origin response is needed for the benefit of a client and (ii) generate the processed client response including the content item and, if needed, any change to the cached processed origin response for the benefit of the client.

14. The computer system of claim 13, wherein the processed client response is identical to the cached processed origin response.

15. The computer system of claim 13, wherein the processed client response is identical to the processed origin response.

16. The computer system of claim 13, wherein the processed client response is identical to the origin response.

* * * * *